Oct. 20, 1925. Re. 16,188

H. S. HORNBECK

SHEET ADJUSTER FOR PRINTING PRESSES

Original Filed Dec. 8, 1921

INVENTOR

Henry S. Hornbeck

By Charles G. Cope
Attyr.

Reissued Oct. 20, 1925. Re. 16,188

UNITED STATES PATENT OFFICE.

HENRY S. HORNBECK, OF RIVERHEAD, NEW YORK, ASSIGNOR TO MILLER SAW-TRIMMER COMPANY, OF PITTSBURGH, PENNSYLVANIA, A CORPORATION OF PENNSYLVANIA.

SHEET ADJUSTER FOR PRINTING PRESSES.

Original No. 1,479,914, dated January 8, 1924, Serial No. 520,909, filed December 8, 1921. Application for reissue filed July 14, 1925. Serial No. 43,634.

*To all whom it may concern:*

Be it known that I, HENRY S. HORNBECK, a citizen of the United States, residing at Riverhead, in the county of Suffolk and State of New York, have invented new and useful Improvements in Sheet Adjusters for Printing Presses, of which the following is a specification.

This invention has for its object to provide an improved device, operated by the movement of the press itself, for the purpose of moving into accurately registered position each sheet of paper when it has been placed by hand or by an automatic feeder, upon the platen of a printing press. When such a sheet is placed upon the platen it comes to rest by gravity against the bottom stops; if by chance it rests against the side stop no further movement of the sheet is necessary, but since the sheet is generally thrown toward the side stop it generally rebounds slightly therefrom and sometimes does not reach the side stop. It is therefore necessary that the sheet, after it has been placed on the platen, resting against the bottom stops, be moved toward the side stop with an easy motion which will cause no rebound and by a device which has a range of movement greater than the maximum displacement of the sheet. The device which moves the sheet should also be of such a character that it will move the sheet only so far as may be necessary to place it in contact with the side stop and without any tendency to cause the sheet to buckle. The sheet moving device or sheet adjuster which forms the subject of this invention has been devised with a view to the meeting of these requirements in a satisfactory manner, the device being so constructed that it can be adapted readily to sheets of different thicknesses and different degrees of stiffness. In accordance with the invention there is mounted on the platen of the press, by means which permit it to be placed in whatever position may be required, a movable shifter which receives the sheet of paper, as between the finger and thumb of a hand and with a readily adjustable pressure which is suited to the character of the sheet, and is then, at the proper time in the operation of the press, moved in the direction of the side stop, carrying the sheet with it until its movement is resisted by contact of its edge with the side stop and continuing its own movement thereafter while permitting the sheet of paper to remain in position without being buckled. The invention will be more fully explained hereinafter with reference to the accompanying drawing in which it is illustrated and in which—

The improved shifter, as will be understood, is capable of application to presses of different constructions. It is shown herein as applied to an ordinary platen *a* which has stretched upon it as usual a fabric sheet *b* of some suitable material, as cloth or paper and as having in pivoted relation therewith a gripper bar *c* which carries the usual gripper arms which serve to hold the printed sheet against the platen as it moves away from the type after the impression has been made. It is not necessary to show or describe herein the means by which the relative movement of the platen and the gripper bar is effected, since such means are common in the art, it being understood that the one has a swinging movement with respect to the other about their common axis which in this case is indicated at *c*. Bottom stops *d* against which the lower edge of the paper sheet *e* rests by gravity, are secured to the platen in proper position. As shown, each stop is provided with a single sharpened and bent finger or prong $d$ which is slipped into the platen sheet $b$ to secure the stop in position. There is also secured to the platen or to its sheet $b$, in any suitable manner, a side stop $f$ against which the edge of the paper $e$ must rest when the sheet is in proper position and against which it is to be moved by the shifter.

The shifter which forms the subject of this invention comprises two opposed fingers $g$ and $h$ which are adapted to receive between them the edge of the sheet of paper, the finger $g$ being curved away from the platen and rounded on its contact side while the finger $h$ is bent toward the platen, as indicated at $h'$. The two fingers are pressed together with an adjustable and yielding pressure as by a thumb screw $i$, a yielding cushion $i'$ being interposed between the two so that the two fingers can be pressed more or less tightly together and the pressure with which the paper sheet is held between them be regulated according to the thickness and stiffness of the paper which is being printed. The two fingers are pivoted together, as by a pivot $k$, upon a base or holder $l$ which is provided with pointed and bent prongs $l'$ by which the holder can be secured in position on the platen sheet $b$. A spring $m$ is secured to the base or holder $l$ for co-operation with the shifter for the purpose of returning it to normal position when it is released by the operating means hereinafter described. The shifter is also provided with an operating arm $h^2$ which is connected, as by a cord $n$, with an adjustable clamp $c^3$ mounted on the gripper bar $c$.

Figure 1:
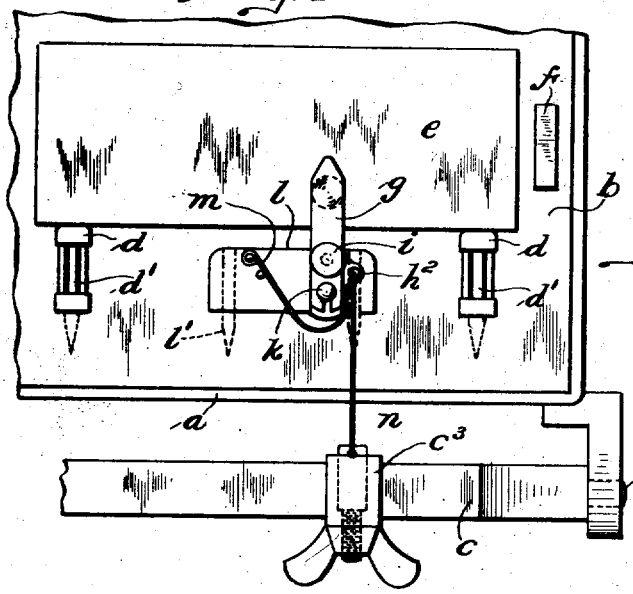
Figure 1 is a view in elevation showing a portion of the platen of the press with its stops and the improved shifter in position thereon and with a portion of the usual gripper bar which carries the usual gripper arms, the shifter being shown in its normal position of rest.
Figure 4:
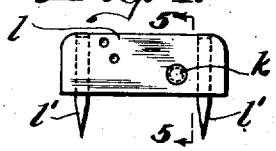
Figure 4 is a detail view of the holder which supports the shifter.
Figure 5:
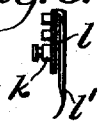
Figure 5 is a detail view in section on the plane indicated on the broken line 5—5 of Figure 4.
Figure 6:
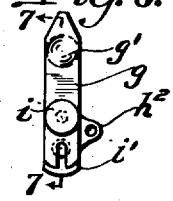
Figure 6 is a detail view of the shifter removed from its support.
Figure 7:
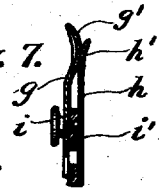
Figure 7 is a view in section on the plane indicated by the broken line 7—7 of Figure 6.
Figure 2:
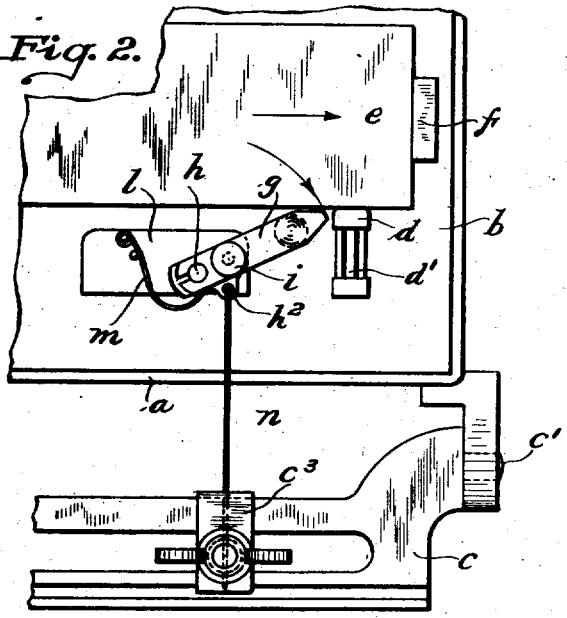
Figure 2 is a similar view showing the shifter moved through its full range of movement with the sheet in position against the stops.
Figure 3:
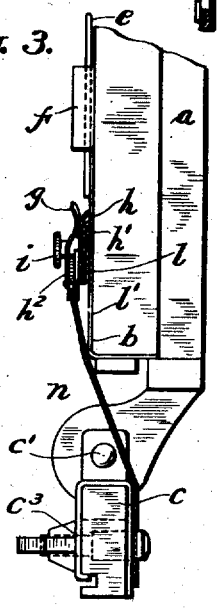
Figure 3 is a view in end elevation as seen from the right hand in Figure 2.

In operation the sheet of paper, when fed against the bottom stops either by hand or otherwise, is received by the shifter between the fingers $g$ and $h$ with a pressure which is so regulated as to be sufficient to move the sheet of paper when such movement is not resisted by a stop. As the relative positions of the platen and gripper bar change in the operation of the press, in the usual manner, the cord $n$ is tightened and the shifter is moved from the normal position shown in Figure 1 to one side, as shown in Figure 2, carrying the sheet of paper to one side until its movement is resisted by the side stop $f$. As soon as the movement of the sheet of paper is resisted by the side stop the shifter slips with reference to the sheet of paper, leaving the sheet of paper in position against the side stop without any rebound. Obviously the sheet of paper, after being printed, might be withdrawn readily from the shifter, whatever its movement or position, without danger of tearing, but when the shifter has a swinging movement, as described, the shifter itself, as it completes its movement, will swing clear of the lower edge of the sheet of paper, as it rests upon the bottom stops, as shown in Figure 2.

It will be seen that the sheet of paper to be adjusted and printed is received by the shifter with a yielding pressure adapted to the quality of the paper, is moved gently toward the side stop and comes to rest against the same without rebounding and that when the sheet has come to rest in its proper position the shifter continues its movement regardless of the position of the sheet when engaged by the shifter, without any tendency to cause the sheet to buckle. In this position the sheet is secured by the grippers and is held during the making of the impression.

It will be understood that changes in details of construction and arrangement can be made to suit different conditions of use and that except as pointed out in the accompanying claims, the invention is not limited to the particular construction shown and described herein.

I claim as my invention:

1. A sheet adjuster for printing presses comprising movable and opposed fingers adapted to receive between them with a yielding pressure the sheet to be printed, a yielding cushion interposed between the fingers, means to press the fingers together, and means to move the fingers to carry the sheet with them until its movement is resisted.

2. A sheet adjuster for platen printing presses comprising a base, a sheet-engaging member associated with said base so as to have lengthwise and sidewise movement with respect thereto, for registering a sheet endwise and sidewise; means for securing said base on the platen in adjusted positions lengthwise or laterally of the latter, and means for actuating said sheet-engaging member.

3. A sheet adjuster for platen printing presses comprising a base; a sheet-engaging member associated with said base so as to have lengthwise and sidewise movement with respect thereto, for registering a sheet endwise and sidewise; means for securing said base in adjusted positions on the platen; and means, adjustable to accord with the position of said base on the platen, for actuating said sheet engaging member.

4. A sheet adjuster for platen printing presses comprising a base, a sheet-engaging member pivotally associated with said base for registering a sheet endwise and sidewise, means for securing said base on the platen in adjusted positions lengthwise or laterally of the latter, and means for actuating said sheet-engaging member.

5. A sheet adjuster for platen printing presses comprising a base, a sheet-engaging member pivotally associated with said base for registering a sheet endwise and sidewise, means for securing said base on the platen in adjusted positions lengthwise or laterally of the latter, and connection means between said sheet-engaging member and the gripper-bar of the platen for actuating said sheet-engaging member.

6. A sheet adjuster for platen printing presses comprising a base, a sheet-engaging member pivotally associated with said base for registering a sheet endwise and sidewise, means for securing said base in adjusted positions on the platen, and connection means between said sheet-engaging member and the gripper-bar of the platen for actuating said sheet engaging member, said connection means being adjustable to accord with the position of said base on the platen.

7. A sheet adjuster for platen printing presses comprising a base, a sheet-engaging member pivotally associated with said base for registering a sheet endwise and sidewise, means for securing said base in adjusted positions on the platen, and cord-like connection means between said sheet-engaging member and the gripper bar of the platen for actuating said sheet-engaging member.

8. A sheet adjuster for platen printing presses comprising a base formed with a portion for penetrating the tympan sheet of the platen, thereby to permit said base to be secured in any desired position on the platen; a sheet-engaging member associated with said base so as to have lengthwise and sidewise movement with respect thereto for registering a sheet endwise and sidewise; and means for actuating said sheet-engaging member.

HENRY S. HORNBECK.